United States Patent
Sakurai et al.

[11] 3,867,915
[45] Feb. 25, 1975

[54] HEATED INDUCTION SYSTEM FOR INTERNAL COMBUSTION ENGINES

[75] Inventors: Yoshitoshi Sakurai, Kawasaki; Satoru Ohata, Oi-machi, both of Japan

[73] Assignee: Honda Giken Kogyo Kabushiki Kaisha, Tokyo, Japan

[22] Filed: June 22, 1973

[21] Appl. No.: 372,745

[30] Foreign Application Priority Data
June 28, 1972 Japan................................. 47-64668

[52] U.S. Cl...... 123/75 B, 123/32 SP, 123/122 AB, 123/122 AC, 123/32 ST, 123/122 A
[51] Int. Cl........................ F02b 19/10, F02b 19/16
[58] Field of Search... 123/122 A, 122 AB, 122 AC, 123/75 B, 32 SP, 32 ST, 52 M

[56] References Cited
UNITED STATES PATENTS

| | | | |
|---|---|---|---|
| 1,285,916 | 11/1918 | Bradburn...................... | 123/122 AB |
| 1,705,036 | 3/1929 | Taub............................. | 123/122 AB |
| 1,744,319 | 1/1930 | Link............................. | 123/122 AC |
| 1,777,472 | 10/1930 | Mock............................ | 123/122 AB |
| 3,092,088 | 6/1963 | Goussak...................... | 123/32 SP |
| 3,382,856 | 5/1968 | McIlroy........................ | 123/122 AB |
| 3,659,564 | 5/1972 | Suzuki.......................... | 123/32 SP |
| 3,780,715 | 12/1973 | Flitz............................. | 123/122 AB |

*Primary Examiner*—Charles J. Myhre
*Assistant Examiner*—Ronald B. Cox
*Attorney, Agent, or Firm*—Lyon & Lyon

[57] ABSTRACT

An internal combustion engine has a main combustion chamber and an auxiliary combustion chamber which are in communication through a passage called a torch nozzle. The spark plug in the auxiliary chamber ignites the fuel-air mixture therein producing a torch flame which passes through the torch nozzle to ignite the mixture supplied to the main combustion chamber. The mixture supplied to the auxiliary chamber is richer than that supplied to the main chamber and to enhance the combustibility of the rich mixture, particularly upon cold starting of the engine, the present invention provides an auxiliary intake passage arranged in adjacent relationship with an exhaust pipe of the engine with a boundary wall therebetween composed of a material having a low heat capacity so that the rich mixture flowing to the auxiliary chamber is rapidly heated by the hot exhaust gases.

4 Claims, 3 Drawing Figures

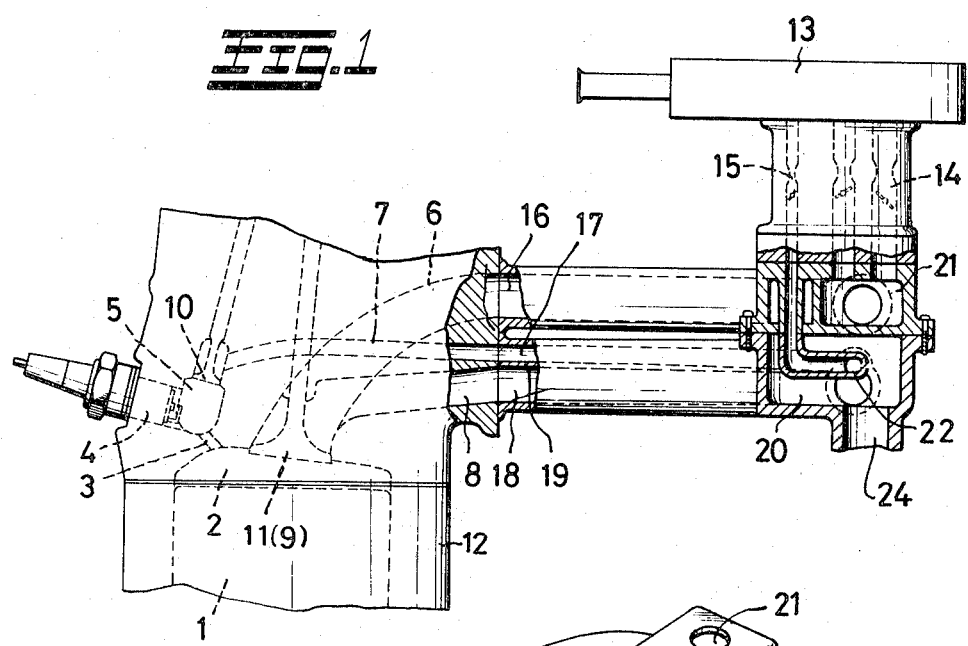
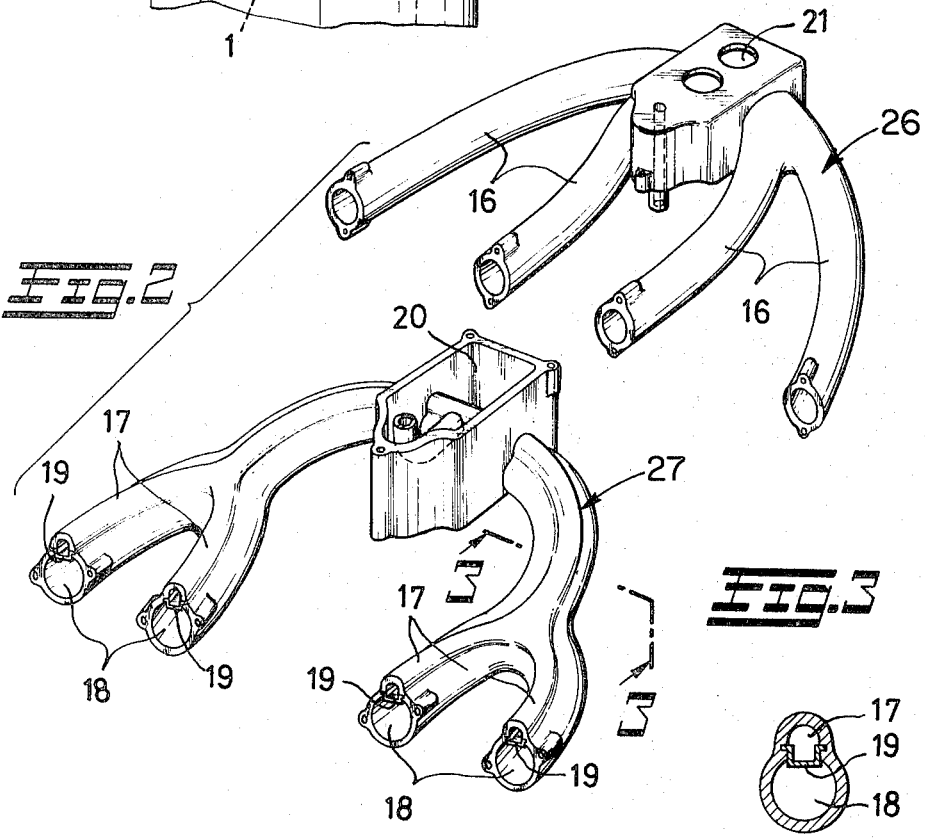
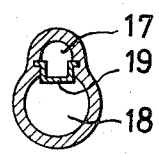

HEATED INDUCTION SYSTEM FOR INTERNAL COMBUSTION ENGINES

This invention relates to internal combustion engines, and particularly to such engines having a main combustion chamber and an auxiliary combustion chamber connected by a passage called a torch nozzle. Both chambers receive a fuel-air mixture, the mixture being supplied to the auxiliary chamber being rich and the mixture supplied to the main chamber being lean. A spark plug is situated adjacent the auxiliary chamber and it ignites the rich mixture therein producing a torch flame which issues through the torch nozzle to ignite the lean mixture in the main chamber. In such a combustion system, when the engine starts from its cold condition, the rich mixture taken into the auxiliary intake passage as well as into the auxiliary combustion chamber tends to condense upon the cold wall surfaces thereof resulting in decreased fuel economy and incomplete combustion causing an emission of unburned hydrocarbons which are a cause of air pollution.

It is the principal object of the present invention to provide an induction system for an internal combustion engine of the type previously described in which the mixture supplied to the auxiliary chamber will be completely burned even in the case of starting a cold engine and therefore the objectionable pollutants in the exhaust will be reduced. Specifically, it is an object of the present invention to provide an induction system for an internal combustion engine of the type described which will enhance the fuel economy thereof while at the same time decreasing the emission of unburned hydrocarbons therefrom. These and other objects are accomplished by the present invention by providing an auxiliary intake passage through which the rich mixture of fuel is supplied to the auxiliary combustion chamber. This auxiliary intake passage is arranged in intimate relationship with the exhaust passages of the engine with a common wall between these passages wherein this common wall is composed of a material having a low heat capacity so that the heat of the exhaust gases will be rapidly transferred to the incoming mixture to thereby at least partially vaporize the same, at the same time keeping the interior walls thereof warm so as to decrease condensation thereon. The result is a more complete and even burning of the auxiliary fuel mixture.

Other objects and advantages of the present invention will become readily apparent upon reading the ensuing detailed description.

DESCRIPTION OF THE DRAWINGS

FIG. 1 is a sectional side elevation of a portion of an internal combustion engine employing the preferred embodiment of this invention.

FIG. 2 is an exploded perspective view of the main and auxiliary intake pipes and the exhaust pipes.

FIG. 3 is a sectional view taken along line 3—3 of FIG. 2.

DESCRIPTION OF THE PREFERRED EMBODIMENT

Referring first to FIG. 1, there is shown an engine body 12 having a main combustion chamber 2 formed above a piston 1 and an auxiliary combustion chamber 5 which is in communication with the main chamber 2 by means of a passage 3 called a torch nozzle. The auxiliary combustion chamber 5 has a spark plug 4 mounted in communication therewith. The engine body 12 also includes a main intake passage 6 which communicates with the main chamber 2 and an auxiliary intake passage 7 leading to the auxiliary chamber 5. An auxiliary intake valve 10 is provided between the passage 7 and chamber 5 and, similarly, a main intake valve designated (9) is provided between passage 6 and chamber 2. The body 12 also includes an exhaust passage 8 in communication with chamber 2 through exhaust valve 11. The intake and exhaust valves are shown in dotted lines in FIG. 1 as only a single valve, the particular sectional view taken therein exposing only one of such valves to view, it being understood that there are two such valves, one behind the other.

Coupled to the engine body 12 and specifically to that portion of the body communicating with the main intake passage 6, is the main intake manifold 26 comprising a plurality of main intake pipes 16, the number of which correspond to the number of cylinders of the engine. The pipes 16 join together in a chamber vaporization 21 to which is coupled the carburetors 14 and 15. The chamber 21 provides an area into which the lean fuel-air mixture provided by the main carburetor 14 is first introduced. The second portion of the system comprises the manifold 27 shown in the lower left portion of FIG. 2, having a plurality of exhaust pipes 18 with auxiliary intake pipes 17 formed therewith. The pipes 17 and 18 join in and are coupled to an exhaust collection chamber 20 to which the vaporizing chamber 21 is mounted. A conduit 22 is coupled to passage 17 inside of collection chamber 20 and extends upwardly through chamber 21 where it couples to auxiliary carburetor 15. In the customary manner, the carburetors 14 and 15 are provided with an air cleaner 13. Exhaust pipes 18 join together in collection chamber 20 and exit therefrom through conduit 24.

As shown in FIG. 2 and more clearly in FIG. 3, the auxiliary intake passages 17 and the exhaust pipes 18 are formed integrally so that the passages are in adjacent relationship but separated by a longitudinal cast-in member 19 which establishes a boundary wall between the two passages. The exterior walls which define the intake pipes 17 and the exhaust pipes 18, the size of the auxiliary pipes being substantially less than the exhaust pipes, are made of a material having a large heat capacity, such as a cast metal having a relatively substantial thickness. In comparison to that material and its thickness, the boundary wall 19 is preferably a thin sheet of metal such that it posses relatively low heat capacity. It may be preferable to form the boundary wall 19 into a concave or corrugated configuration so as to broaden the contact area between the two passages to thereby enhance the heat transfer capabilities.

In the use of the aforementioned embodiment, when the engine is started from its cold condition, the relatively rich mixture flowing to the auxiliary chambers 5 through intake passages 17 and 7 is quickly heated by the exhaust gases flowing in exhaust pipes 18 so that the rich mixture is vaporized and therefore burned completely upon ignition even though the inner surfaces of the passages 7 and the auxiliary chambers 5 have not yet been warmed. By constructing the pairs of pipes 17 and 18 such that their outer walls have a large heat capacity, the interior of the auxiliary intake pipe 17 will be kept warm during operation. By the same token, the provision of a boundary wall 19 between the two wherein the boundary has a low heat capacity, permits a rapid heat transfer to the auxiliary intake passage. The provision of the collecting chamber 21 above the exhaust collecting chamber 20 also provides a device for accelerating the vaporization of the lean mixture travelling through the main intake pipes 16. As a result of the foregoing features of the present invention, there is provided an internal combustion engine having enhanced fuel economy and which has an exhaust in which the emission of unburned hydrocarbons is substantially reduced.

Having fully described our invention, it is to be understood that changes and modifications may be made therein without departing from the concept of our invention in its broader aspects, and it is understood that we are not to be limited to the details set forth herein but that our invention is of the full scope of the appended claims.

We claim:

1. In an intake and exhaust manifold assembly for a multi-cylinder internal combustion engine, each cylinder having a main combustion chamber and an auxiliary combustion chamber connected by a torch nozzle, a spark plug associated with each auxiliary combustion chamber, a rich mixture passage communicating with the auxiliary combustion chamber, a lean mixture passage communicating with the main combustion chamber, and an exhaust passage communicating with the main combustion chamber, the improvement comprising, in combination: a main intake manifold having branch pipes communicating with a vaporizing chamber, each pipe being connected to deliver lean mixture to one of said lean mixture passages, respectively, a second manifold having branch pipes communicating with a collection chamber and each connected to receive exhaust gases from one of said exhaust passages, respectively, each exhaust pipe having an auxiliary intake pipe formed integrally therewith and extending throughout the length thereof, a boundary wall separating each auxiliary inlet pipe from its respective exhaust pipe, said auxiliary intake pipes extending from said collection chamber to each of said auxiliary inlet passages, respectively, means for supplying rich mixture to said auxiliary intake pipes, means for securing the chambers together whereby the vaporization chamber may receive heat from the collection chamber, and means for supplying lean mixture to the vaporization chamber.

2. The combination set forth in claim 1 in which the means for supplying rich mixture includes a conduit in the collection chamber extending through the vaporization chamber.

3. The combination set forth in claim 1 in which carburetors mounted on the vaporization chamber supply the rich mixture and the lean mixture.

4. In an intake and exhaust manifold assembly for a multi-cylinder internal combustion engine, each cylinder having a main combustion chamber and an auxiliary combustion chamber connected by a torch nozzle, a spark plug associated with each auxiliary combustion chamber, a rich mixture passage communicating with the auxiliary combustion chamber, a lean mixture passage communicating with the main combustion chamber, and an exhaust passage communicating with the main combustion chamber, the improvement comprising, in combination: a main intake manifold having branch pipes communicating with a vaporizing chamber, each pipe being connected to deliver lean mixture to one of said lean mixture passages, respectively, a second manifold having branch pipes communicating with a collection chamber and each connected to receive exhaust gases from one of said exhaust passages, respectively, each exhaust pipe having an auxiliary intake pipe formed integrally therewith and extending throughout the length thereof, a boundary wall separating each auxiliary inlet pipe from its respective exhaust pipe, said auxiliary intake pipes extending from said collection chamber to each of said auxiliary inlet passages, respectively, conduit means in the collection chamber extending through the vaporization chamber for supplying rich mixture to said auxiliary intake pipes, means for securing the chamber together whereby the vaporization chamber may receive heat from the collection chamber, and carburetor means for supplying a lean mixture to the collection chamber and a rich mixture to the said conduit means.

* * * * *

UNITED STATES PATENT OFFICE
CERTIFICATE OF CORRECTION

Patent No. 3,867,915          Dated February 25, 1975

Inventor(s) YOSHITOSHI SAKURAI, SATORU OHATA

It is certified that error appears in the above-identified patent and that said Letters Patent are hereby corrected as shown below:

Col. 2, lines 21-22, "chamber vaporization 21" should read --vaporization chamber 21--.

Co. 2, line 50, "posses" should read --possesses--.

Signed and sealed this 27th day of May 1975.

(SEAL)
Attest:

RUTH C. MASON
Attesting Officer

C. MARSHALL DANN
Commissioner of Patents
and Trademarks